(12) United States Patent
Ehrlich

(10) Patent No.: US 7,256,956 B2
(45) Date of Patent: Aug. 14, 2007

(54) PROPAGATION SELF SERVOWRITE USING SELF-WRITTEN SPIRAL SIGNALS FOR IN-PROCESS CALIBRATION

(75) Inventor: Richard M. Ehrlich, Saratoga, CA (US)

(73) Assignee: Matsushita Electric Industrial Co., Ltd., Kadoma-shi, Osaka (JP)

( * ) Notice: Subject to any disclaimer, the term of this patent is extended or adjusted under 35 U.S.C. 154(b) by 209 days.

(21) Appl. No.: 11/081,340

(22) Filed: Mar. 16, 2005

(65) Prior Publication Data
US 2006/0209449 A1 Sep. 21, 2006

(51) Int. Cl.
*G11B 21/02* (2006.01)
(52) U.S. Cl. ............................................. 360/75
(58) Field of Classification Search ............ None
See application file for complete search history.

(56) References Cited

U.S. PATENT DOCUMENTS

| 4,414,589 A | 11/1983 | Oliver et al. ............... 360/77 |
| 5,668,679 A | 9/1997 | Swearingen et al. ......... 360/75 |
| 5,682,274 A * | 10/1997 | Brown et al. ............ 360/77.04 |
| 6,061,200 A | 5/2000 | Shepherd et al. ........ 360/77.04 |
| 6,519,107 B1 * | 2/2003 | Ehrlich et al. ............... 360/75 |
| 6,631,046 B2 | 10/2003 | Szita et al. ................... 360/75 |
| 6,653,805 B2 * | 11/2003 | Menegoli ................... 318/254 |
| 6,771,443 B2 * | 8/2004 | Szita et al. ................... 360/51 |
| 6,977,789 B1 * | 12/2005 | Cloke ........................... 360/75 |
| 2001/0040752 A1 | 11/2001 | Szita et al. |

* cited by examiner

*Primary Examiner*—K. Wong
(74) *Attorney, Agent, or Firm*—Fliesler Meyer LLP

(57) ABSTRACT

The operation of propagation self servowrite can be improved by using spirals written upon the disk. The spirals can be used to reduce the DC drift of the propagation of the self servowrite. The writing of the spirals can be improved by using the back EMF signal for the VCM to control the velocity of the actuator during the writing of the spirals to produce a more consistent spiral shape. Additionally, back EMF crossings of the spindle can be used to space the spirals evenly about the disk.

16 Claims, 3 Drawing Sheets

$$V_{VCM} = iR + L\frac{di}{dt} + V_{backEMF}$$

PROPAGATION SELF SERVOWRITE USING SELF-WRITTEN SPIRAL SIGNALS FOR IN-PROCESS CALIBRATION

FIELD OF THE INVENTION

The present invention relates to servowriting processes, systems, and devices.

BACKGROUND

Advances in data storage technology have provided for ever-increasing storage capability in devices such as DVD-ROMs, optical drives, and disk drives. In hard disk drives, for example, the width of a written data track has decreased due in part to advances in reading, writing, and positioning technologies. More narrow data tracks result in higher density drives, which is good for the consumer but creates new challenges for drive manufacturers. As the density of the data increases, the tolerance for error in the position of a drive component such as a read/write head decreases. As the position of such a head relative to a data track becomes more important, so too does the placement of information, such as servo data, that is used to determine the position of a head relative to a data track.

One servowriting technique involves self servowriting. One class of self-servowriting techniques is know as propagation self-servowriting. In propagation self servowriting, signals from previously written servo wedges are used to determine the position of later servo wedges. In this way, the servo wedges are propagated across the disk.

BRIEF SUMMARY

One embodiment of the present invention concerns writing spirals on a disk. The spirals can then be used during propagation self-servowriting on the disk. In one embodiment, the spirals are used to remove DC drift or other errors that can accumulate during propagation self-servowriting. In one embodiment, the velocity of the actuator during spiral writing is controlled using actuator back EMF.

In one embodiment, the start-time and write-clock used to write the spirals is controlled using spindle back EMF crossings.

Other features, aspects, and objects of the invention can be obtained from a review of the specification, the figures, and the claims.

DETAILED DESCRIPTION

Figure 1:
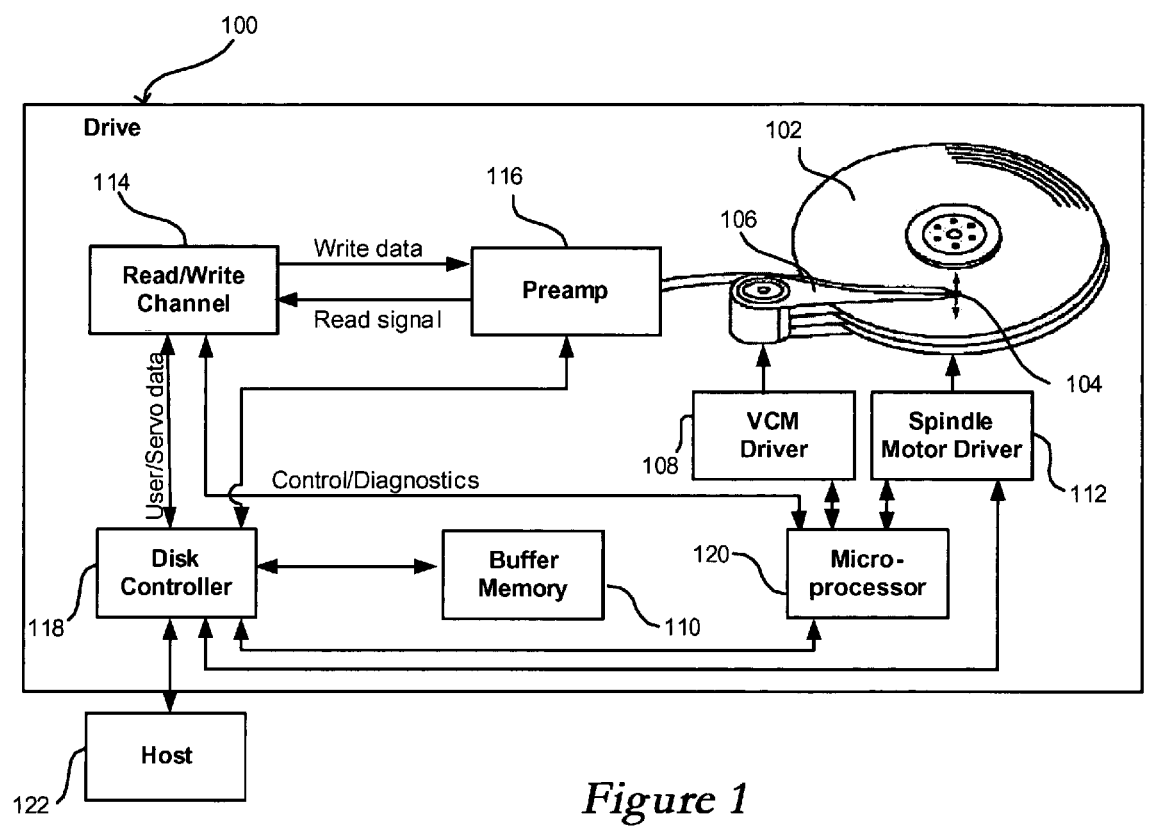
FIG. 1 is a functional diagram showing components of a disk drive that can be used in accordance with embodiments of the present invention.

Systems and methods in accordance with various embodiments of the present invention can be used when servowriting, or self-servowriting, a rotatable storage medium in a data storage device, such as a hard disk drive. For example, a typical disk drive 100, as shown in FIG. 1, includes at least one magnetic disk 102 capable of storing information on at least one of the surfaces of the disk. A closed-loop servo system can be used to move an actuator arm 106 and data head 104 over the surface of the disk, such that information can be written to, and read from, the surface of the disk. The closed-loop servo system can contain, for example, a voice coil motor driver 108 to drive current through a voice coil motor (not shown) in order to drive the actuator arm, a spindle motor driver 112 to drive current through a spindle motor (not shown) in order to rotate the disk(s), a microprocessor 120 to control the motors, and a disk controller 118 to transfer information between the microprocessor, buffer memory 110, read channel 114, and a host 122. A host can be any device, apparatus, or system capable of utilizing the data storage device, such as a personal computer or Web server or consumer electronics device. The drive can contain at least one processor, or microprocessor 120, that can process information for the disk controller 118, read/write channel 114, VCM driver 108, or spindle driver 112. The microprocessor can also include a servo controller, which can exist as an algorithm resident in the microprocessor 120. The disk controller 118, which can store information in buffer memory 110 resident in the drive, can also provide user data to a read/write channel 114, which can send data signals to a current amplifier or preamp 116 to be written to the disk(s) 102, and can send servo and/or user data signals back to the disk controller 118. A controller for the data storage device can include the disk controller 118 and/or processor 120. The controller can be on one or multiple chips. In one embodiment, a controller chip contains SRAM while DRAM and FLASH are external to the chip. Other memory arrangements can also be used.

The information stored on disks can be written in concentric tracks, extending from near the inner diameter (ID) of the disk to near the outer diameter (OD) of the disk. In an embedded servo-type system, servo information can be written in servo wedges, and can be recorded on tracks that can also contain data. In a system where the actuator arm rotates about a pivot point such as a bearing, the servo wedges may not extend linearly from the inner diameter of the disk to the outer diameter, but may be curved slightly in order to adjust for the trajectory of the head as it sweeps across the disk.

Many different types of propagation self-servowriting schemes have been proposed in the past. One example of such a scheme is U.S. Pat. No. 4,414,589, by Oliver et al., titled "Embedded Servo Track Following System and Method for Writing Servo Tracks", included herein by reference. Another later example is U.S. Pat. No. 6,631,046, by Szita, et al., titled "Servo Track Writing Using Extended Copying With Head Offset", also included herein by reference. The methods disclosed therein, along with other variations, could benefit from application of the current invention.

Figure 2:
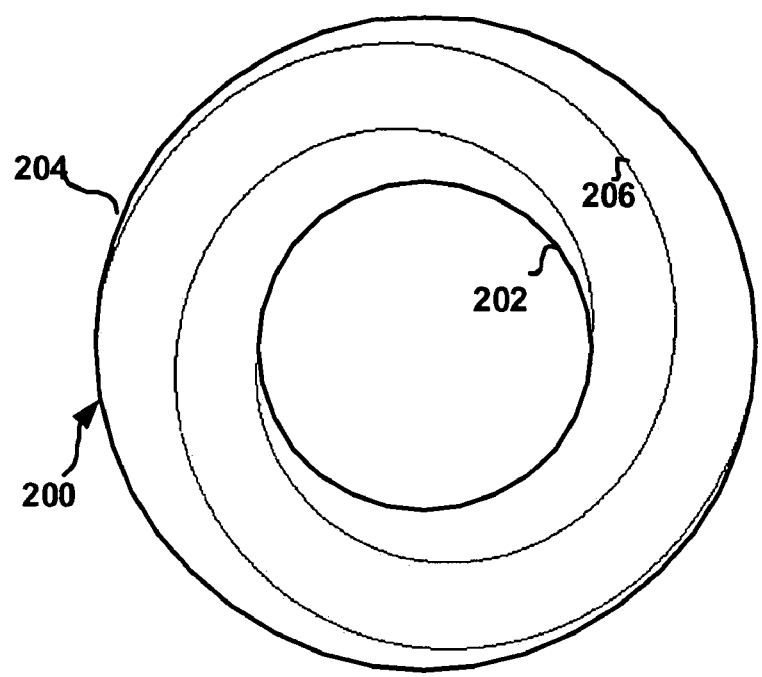
FIG. 2 is a diagram showing spirals written on a disk.

Embodiments of the present invention use spirals on the disk in order to aid in the propagation servo writing. FIG. 2 illustrates one embodiment illustrating the system and method of the current invention. FIG. 2 illustrates a disk 200. The disk includes an inner diameter 202 and outer diameter 204. Spirals extend from the inner diameter 202 to the outer diameter 204. The spirals give the system an indication of the radial and circumferential data head position relative to that of the disk when the path of the spiral is known. In one embodiment, the spirals are written with the actuator moving across the disk with a relativity constant velocity in order to standardize the spiral shape. The spirals can include a written pattern such as a pattern of alternating magnetic polarities to aid in the positioning of the data head. The steady pattern of alternating magnetic polarities can occasionally be interrupted by another pattern (for example, a missing pair of signal-transitions) in order to allow the spirals to provide a more coarse timing signal. In one embodiment, the spirals are written using a write-clock that is phase-locked to the spindle rotation, using the timing of spindle-motor back-EMF crossings as a timing-feedback mechanism. For example, a PLL can be locked to spindle back-EMF signals (which typically occur 10's of times per revolution of the disk). An example of a self-servowriting system which uses some (but not all) to these techniques can be found in U.S. Pat. No. 5,668,679, by Swearingen et al, entitled "System for Self-Servowriting a Disk Drive", incorporated herein by reference. In Swearingen et al , the spirals are the only source of radial position information used for self-servowriting. In the invention disclosed here, the spirals are used only to compensate for low-frequency errors (on the order of 1 or 2 times the rotational rate of the disk, or below) in radial placement of final servo wedges, which are difficult to compensate for in any other way.

Figure 3:
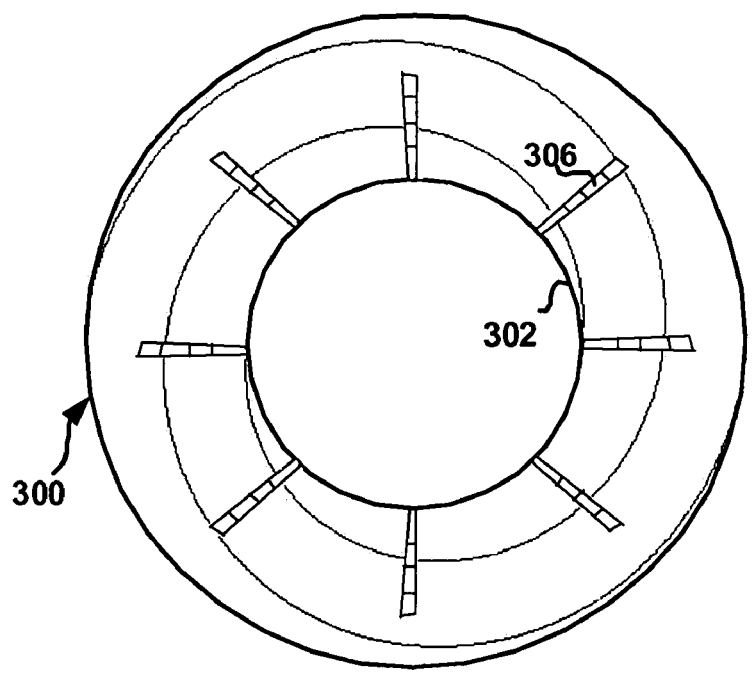
FIG. 3 is a diagram showing propagating servo wedges and spirals on a disk.

FIG. 3 illustrates an example in which propagation self servowrite is done. In the propagation self servowrite, wedges 306 are written at different positions on the disk 300. FIG. 3 shows the wedges without curature, but the propagated final wedges can have some curvature as they go across the stroke of the disk. This matches a path that a rotary actuator takes across the stroke.

Propagation self servowrite can be done relatively accurately to reduce repeatable runout (RRO). While servoing on previously-written wedges, the servo can use well-known techniques to estimate the written-in runout of those wedges. Once an estimate of that written-in runout is known, it can be subtracted from the measured PES (Position-Error Signal) on each wedge to prevent servowriting errors from propagating (and possibly growing) from track to track. One example of such a technology can be found in the application Ser. No. 11/018,202 filed Dec. 20, 2004, by Ehrlich et al., entitled "Methods for WORF Improvement in Conditional Servowriting", incorporated herein by reference. Another example of such a technique can be found in U.S. Pat. No. 6,061,200, by Shepherd et al., entitled "In-drive correction of servo pattern errors", also incorporated herein by reference. Yet another example can be found in U.S. Pat. No. 6,631,046, by Szita et al., entitled "Servo Track Writing Using Extended Copying With Head Offset", also incorporated herein by reference. Although referred to by many different names, in different documents, such techniques for reduction of the effects servowriting errors will be referred to here as WORF (for Wedge-Offset Reduction Field) technology. One potential problem with the use of these techniques in propagation self servowriting is DC or low-frequency drift. WORF technology uses knowledge of the synchronous PES and the servo-loop's response as a function of frequency to determine the written-in runout of a track. If the servo-loop's gain is very high at a particular frequency, then the corresponding component of sensed synchronous runout (after attenuation by the servo loop) must be multiplied by a very large value to determine the original written-in runout. The result can be that small inaccuracies in the sensed synchronous runout or in the servo loop-gain can cause large errors in an estimate of the written-in runout. For frequencies at which the servo loop-gain is not very high, such problems are not significant. For a typical disk-drive servo-loop, these problems are typically present for DC errors (at which the servo loop-gain is extremely high, if not infinite) and the first harmonic of the spin-frequency of the disk (often referred to as the "1X frequency", at which the servo loop-gain can be 40 dB or greater). It is possible that the servo loop-gain is also high at other harmonics of the disk spin-speed (for example, at the second or third harmonic) as well, but the problems are typically worst at DC and the first spin-speed harmonic. For these frequencies, it would be best to use another technique to control the propagation (and buildup) of servowriting errors. Detection of the spirals while servoing on servowritten wedges can be done to estimate and eliminate or reduce DC, 1X or higher frequency servowriting errors. The position of the spiral gives a direct indication of the radial position of the data head (and therefore, the radial position of the servowritten wedges). One embodiment of the use of spirals for position determination is given in Swearingen et al., referred to earlier. Other techniques for determination of radial position through use of spiral signals could be contemplated by one of ordinary skill in the art.

DC timing drift occurs when there is a slight timing error in the writing of a servo wedge from a previous servo wedge. These timing errors can accumulate in the form of a DC drift in the circumfrential position of the servo wedges. Signals from the spirals could be used to estimate and eliminate or reduce timing error propagation (and growth). Alternatively, a self-servowriting system could use timing information from detection of back-EMF crossings from the spindle-motor driver to estimate and eliminate or reduce timing-drift of the servowritten wedges.

The spirals and/or spindle back-EMF signals can be used to get more accurate timing information to correct any DC or low-frequency timing drift on the wedges by adjusting the timing of the writing of the servo wedges. The correction can be done as often as once a revolution, or only after several servowriting-steps have taken place since the most recent adjustment.

Figure 4:
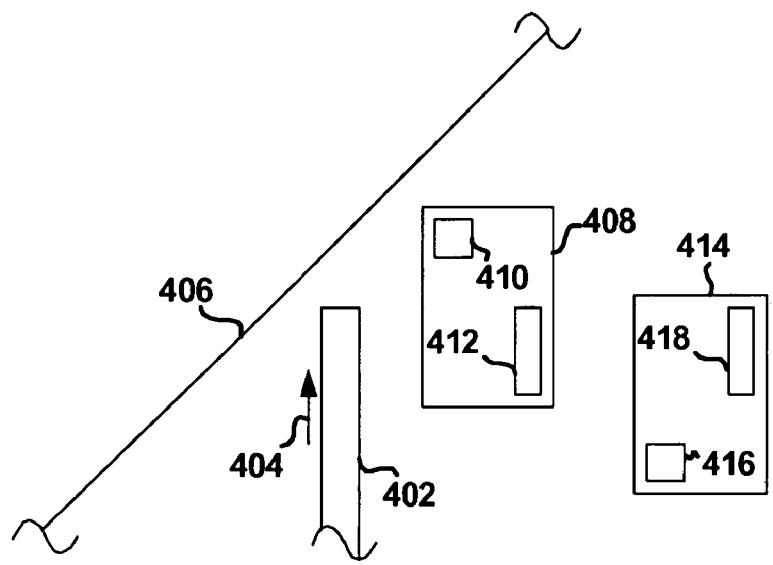
FIG. 4 is a diagram showing the position of different data heads for the system of the present embodiment.

FIG. 4 is an illustration showing the writing of servo wedges 402, along the direction of propagation 404. Spiral segment 406 is also shown. The exemplary data head 408 includes a read element 410 and a write element 412. In this example, the head 408 is arranged such that the written servo wedges 402 do not interfere with detection of the spiral 406. But for the purposes of propagation self-servowriting in the direction 404, head 408 has the problem that it is not able to write new wedges while reading previously-written wedges.

The alternate data head 414 works well for propagation self servowriting in the direction 404. In this case, the read element 416 can read a previously written servo wedge before the write element 418 writes new servo wedges. In this example, the spirals can be detected and portions of the spirals that are not written over by the propagating servo wedges 402 can be used to correct the DC and/or low-frequency radial drift.

The determination of the data head position information from the spirals can be calculated by the controller. The spiral can include written pattern information to aid in the determination of the data head position, as described in Swearingen et al.

One embodiment of the present invention involves improvements in writing the spiral. The velocity of the actuator when writing the spirals can be controlled to maintain a constant velocity. In one embodiment, the actuator back EMF from the voice coil motor (VCM) is used.

Figure 5:
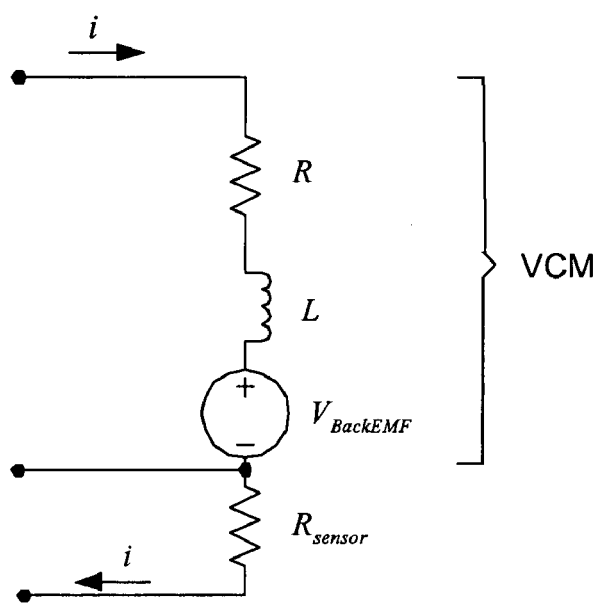
FIG. 5 is a diagram of a model of a voice coil motor illustrating the back EMF voltage.

FIG. 5 shows a VCM modeled as with resistance, R, an inductance L, and back EMF voltage, $V_{backEMF}$. As is well known to one of skill in the art, when electromagnetic motors turn, an open-circuit voltage is generated. This voltage is generally referred to as the back-Electro-Motive Force or back-EMF. In the example of FIG. 5, the electrical response of an electromagnetic motor is modeled using the equation:

$$V_{VCM} = iR + L\frac{di}{dt} + V_{backEMF}$$

In this equation, the $V_{backEMF}$ is proportional to the velocity of the actuator. In this way, the actuator can be controlled to move at a relatively constant velocity by using the actuator back EMF signal, $V_{backEMF}$, as feedback. The control signal to the VCM can be reduced when the velocity is above a desired value and increased when the velocity is below the desired value. This allows the velocity of the actuator to be made more constant, thus the quality of the spirals can be improved. Since the introduction of ramp-loaded R/W heads to hard disk drives (which requires controlling the VCM motion in the absence of any signal from the heads during a portion of head-loading and unloading operations), most drives have the capability to control the velocity of the VCM using sensed back-EMF. This capability can be used to advantage during the writing of spirals for the purpose of assisting later SSW operations.

An additional improvement to the spirals can be made by spacing the spirals using spindle back EMF crossings. In one embodiment, the spindle motor has multiple phases. Each phase can be modeled as the leg of a transformer. In one embodiment, the spindle motor has three phases. A current is sent in through two of the legs and out of one of the legs. The voltage difference between the center and open loop phase goes through zero at certain times when a magnet passes over the coils. These zero crossing times can be used as a measure when the certain orientation. In one embodiment, there are a fixed number of zero crossings for each rotation of the disk. The zero crossing information can be used to determine the orientation of the disk. The back EMF signal can be used to lock a clock to the back EMF crossings using a phase lock loop. In one embodiment, the phase lock loop can be used to produce a clock track with a frequency many thousand times greater than the back EMF spindle crossing frequency. This clock track can be used both for the writing of the servo wedges and for the writing of the spirals. The actuator back EMF and the spindle zero crossing back EMF signals can be used to improve the writing of the spirals. The improved spirals can then be used for any type of self servowriting technique, including (assisting in) propagation self-servowriting.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

What is claimed is:

1. A disk drive comprising:
   an actuator including a write element and a read element; and
   a controller to produce control signals for the actuator, the controller writing spirals on a disk of the disk drive, and propagation self servowriting on the disk, the self-servowriting propagating servo wedges using previously written servo wedges, the spirals being used to adjust the self-servo writing.

2. The disk drive of claim 1, wherein the spirals are used to adjust DC drift in the servo wedges positioning during propagation self servowriting.

3. The disk drive of claim 1, wherein the spiral writing includes controlling the velocity of the actuator during the writing of the spirals using the actuator back EMF as feedback.

4. The disk drive of claim 1, wherein spacing the spirals uses spindle back EMF zero-crossings.

5. The disk drive of claim 4, using a phase lock loop to the spindle back EMF zero-crossings.

6. A disk drive comprising:
   an actuator including a write element and a read element; and
   a controller to produce control signals for the actuator, the controller writing spirals on a disk of the disk drive, the spiral writing including controlling the velocity of the actuator unit during the writing of the spirals using the actuator back EMF as feedback, the controller using the spirals during self servowriting.

7. The disk drive of claim 6, wherein the self servowriting is propagation self servowriting, the self-servowriting propagating servo wedges using previously written servo wedges, the spirals being used to adjust the self-servo writing.

8. The disk drive of claim 7, wherein the spirals are used to adjust DC drift in the servo wedges positioning during propagation self servowriting.

9. The disk drive of claim 6, wherein spacing the spirals uses spindle back EMF zero-crossings.

10. The disk drive of claim 6, using a phase lock loop to the spindle back EMF zero-crossings.

11. A disk drive comprising:
    an actuator including a write element and a read element; and
    a controller to produce control signals for the actuator, the controller writing spirals on a disk of the disk drive, the spiral writing including spacing the spirals using spindle back EMF zero-crossings, the controller using the spirals during self servowriting.

12. The disk drive of claim 11, wherein the self servowriting is propagation self servowriting, the self-servowriting propagating servo wedges using previously written servo wedges, the spirals being used to adjust the self-servo writing.

13. The disk drive of claim 12, wherein the spirals are used to adjust DC drift in the servo wedges positioning during propagation self servowriting.

14. The disk drive of claim 11, using a phase lock loop to the spindle back EMF zero-crossings.

15. The disk drive of claim 11, wherein the spiral writing includes controlling the velocity of the actuator during the writing of the spirals using the actuator back EMF as feedback.

16. A method of servowriting a disk of a disk drive comprising:

writing spirals on a disk;

propagation self servowriting on the disk, the self-servowriting propagating servo wedges using previously written servo wedges, the spirals being used to adjust the self-servo writing.

* * * * *